(12) United States Patent
Weskamp et al.

(10) Patent No.: US 9,021,042 B2
(45) Date of Patent: Apr. 28, 2015

(54) MEDIA RESPONSE TO SOCIAL ACTIONS

(75) Inventors: Marcos Weskamp, San Francisco, CA (US); Jon Lorenz, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 792 days.

(21) Appl. No.: 12/271,862

(22) Filed: Nov. 15, 2008

(65) Prior Publication Data

US 2014/0033202 A1 Jan. 30, 2014

(51) Int. Cl.
*G06F 15/16* (2006.01)
*G06F 9/48* (2006.01)
*H04L 29/08* (2006.01)

(52) U.S. Cl.
CPC .............. *G06F 9/485* (2013.01); *H04L 67/141* (2013.01); *H04L 67/142* (2013.01)

(58) Field of Classification Search
CPC ...... G06F 9/485; H04L 67/141; H04L 67/142
USPC .......... 709/219, 207; 725/114, 106, 105, 135; 348/143
See application file for complete search history.

(56) References Cited

U.S. PATENT DOCUMENTS

| 2003/0070182 | A1* | 4/2003 | Pierre et al. .................... | 725/135 |
|---|---|---|---|---|
| 2005/0097618 | A1* | 5/2005 | Arling et al. ................... | 725/114 |
| 2006/0093998 | A1* | 5/2006 | Vertegaal ....................... | 434/236 |
| 2006/0146854 | A1* | 7/2006 | Park ............................... | 370/428 |
| 2007/0266409 | A1* | 11/2007 | Hsu ................................. | 725/78 |
| 2007/0266410 | A1* | 11/2007 | Balfanz et al. ................... | 725/88 |
| 2008/0232571 | A1* | 9/2008 | Millard et al. ........... | 379/207.12 |
| 2010/0115567 | A1* | 5/2010 | Gupta et al. .................. | 725/106 |

OTHER PUBLICATIONS

Fowler, Geoffrey A., Getting Rid of Cable TV: The Smartest Ways to Cut the Cord, Wall Street Journal, Accessed Aug. 6, 2014, http://online.wsj.com/articles/getting-rid-of-cable-tv-the-smartest-ways-to-cut-the-cord-1405472757.

* cited by examiner

*Primary Examiner* — Hitesh Patel
(74) *Attorney, Agent, or Firm* — Shook, Hardy & Bacon L.L.P.

(57) ABSTRACT

A method includes enabling accessing of content via a first device. The access of the content may be suspended in response to receiving a suspending signal associated with a second device coupled to the first device in a communication session. The access of the content may be resumed via at least one of the first device or a third device coupled to the first device in the communication session.

20 Claims, 11 Drawing Sheets

MEDIA RESPONSE TO SOCIAL ACTIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED. All Rights Reserved.

TECHNICAL FIELD

The present application relates generally to the technical field of data processing. An example embodiment relates to presentation of electronic information in response to social actions.

BACKGROUND

Electronic consumer devices are becoming more advanced with faster processing speed and more complex applications. They are becoming more integrated into daily activities at home or away from the home. Although many of these devices work very well by themselves in certain environments, they still lack capabilities and applications in other environments.

BRIEF DESCRIPTION OF DRAWINGS

Some embodiments are illustrated by way of example and not limitation in the figures of the accompanying drawings in which.

DETAILED DESCRIPTION

For some example embodiments, methods and systems to enable devices to be responsive to social interactions are disclosed. In the following description, for purposes of explanation, numerous specific details are set forth in order to provide a thorough understanding of some example embodiments. It will be evident, however, to one skilled in the art that the present invention may be practiced without these specific details.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Network Architecture

Figure 1:
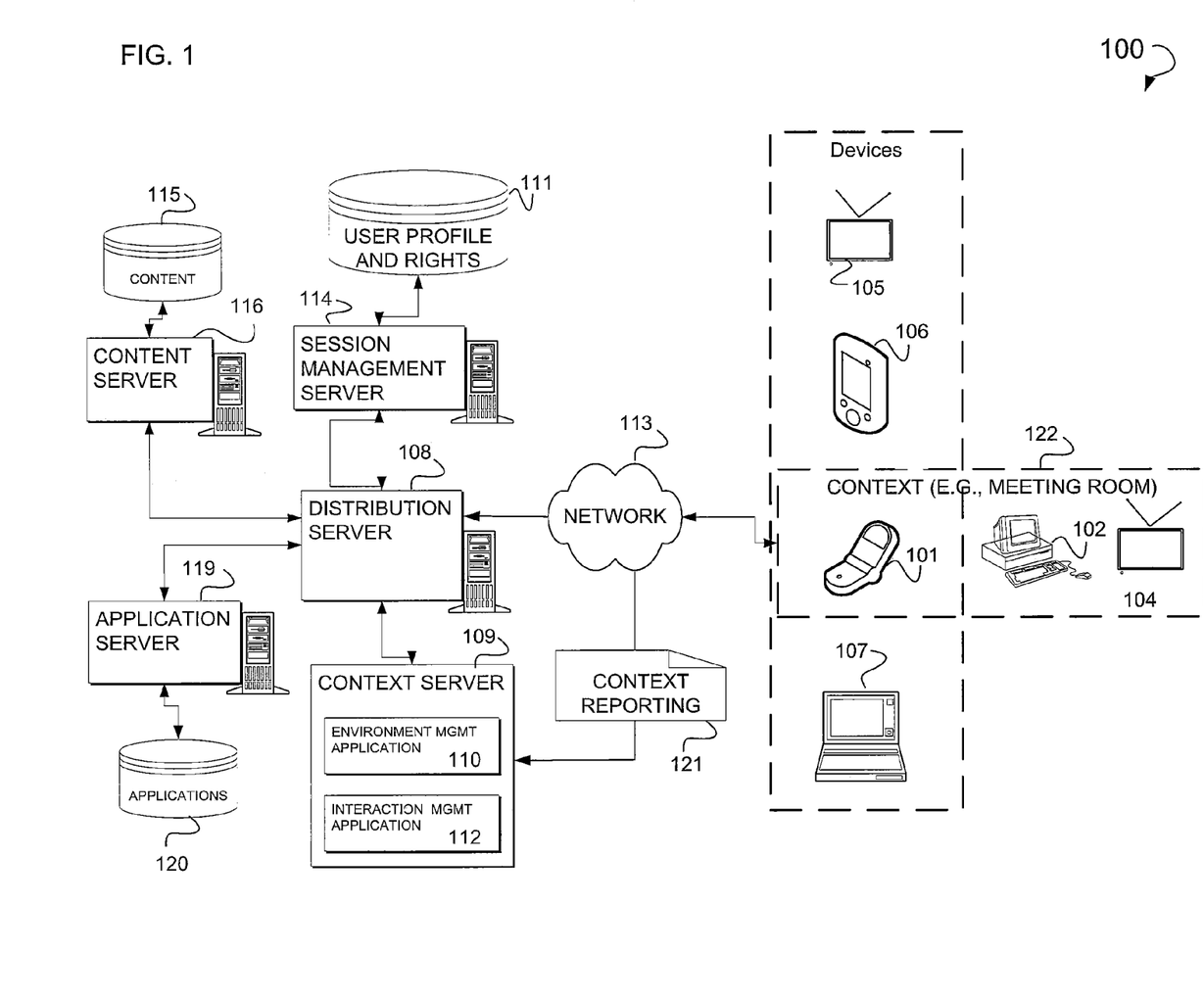
FIG. 1 is a diagram illustrating an example network including network devices and devices, in accordance with some example embodiments.

FIG. 1 is an example network diagram illustrating network devices and devices, in accordance with some example embodiments. In this example, various types of devices may be used. These devices may include, for example, a television 105, Personal Digital Assistant (PDA) 106, cell phone 101, and laptop computer (e.g., "laptop") 107. One or more of these devices may participate in a context 122 with other devices. These other devices may include, for example, a computer 102 and a television 104. The context 122 may be defined to include information about the participating devices (e.g., features, asset, position, etc.), interactions (e.g., sharing asset, etc.) among the devices, and users or operators of the devices. Within the context 122, the cell phone 101, the computer 102, and television 104 may share an asset. Examples of an asset may include content such as a photograph or an application such as a software product.

For some example embodiments, one or more of the devices 101, 102, 104 participating in the context 122 may engage in context reporting. A context report 121 may be generated. The context report 121 includes information relating to the devices and the users participating in a context. The context report 121 may be formatted using an eXtensible Markup Language (XML). The context report 121 may be transmitted from a device to network 113 and received by, for example, distribution server 108. The distribution server 108 may store the context report 121 and may share the context report 121 with other devices. The network 113 may be an Internet, a Local Area Network (LAN), a Wide Area Network (WAN), a combination of the Internet, LAN and/or WAN, or some other suitable type of network as associated topology.

For some example embodiments, the distribution server 108 may be connected to a session management server 114, a context server 109, a content server 116, and an application server 119. These various servers (e.g., 108, 114, 109, and 116) may participate in a cloud computing paradigm. Additionally, these various servers may be implemented on a single computer system, or multiple computer systems. The distribution server 108 may be configured to receive information from the devices 101, 102, 104 and to route the information to one or more of the servers 109, 114, 116 and 119. In addition, the distribution server 108 may be configured to distribute information received from one or more of the servers 109, 114, 116 and 119 to one or more of the devices 101, 102, 104.

The context server 109 may include an environment management module 110 and an interaction management module 112. The interaction management module 112 tracks the interactions among the devices 101, 102, 104 in the context 122. Example interactions include the sharing of assets. The environment management module 110 tracks the environment within which the interaction occurs. The environment includes information relating to the interaction such as the physical location of the devices participating in the context 122, the time and date of participation by the devices 101, 102, 104 within the context 122, the amount and type of assets shared and other suitable information.

The session management server 114 may be used to establish and manage one or more sessions. A session is uniquely identified via a unique numeric identifier (also referred to as a session ID). A session may include one or more devices and may enable the devices to communicate with one another. Each device may be associated with a unique device identifier (also referred to as a device ID). Each user or operator of a device may be associated with a user identifier (also referred to as a user ID). A combination of a session ID with a user ID and/or a device ID may be used to identify participants of a session. The term participant may refer to a combination of either one or both of the user ID and device ID.

The session management server 114 may be associated with a user profile and rights data base 111 which may be used to store the session ID, the user ID, and/or the device ID. The right may include legal rights associated with an asset and its use. The user profile may include personal information about the users of the devices along with their corresponding user IDs.

The content server 116 may be configured to keep track of contents that may be distributed to the devices 101, 102, 104. The contents may include images, video, audio-video, and text-based content. The content is stored in the content data base 115 connected to the content server 116. The application server 119 may be configured to keep track of applications that are distributed to the devices 101, 102, 104. The applications may include executable modules, software components, software applications, etc. These applications are stored in the application database 120. These applications may be used to enhance, augment, supplement, or facilitate the functionality of one or more of the devices 101, 102, 104.

Context and Session Establishment

Figure 2:
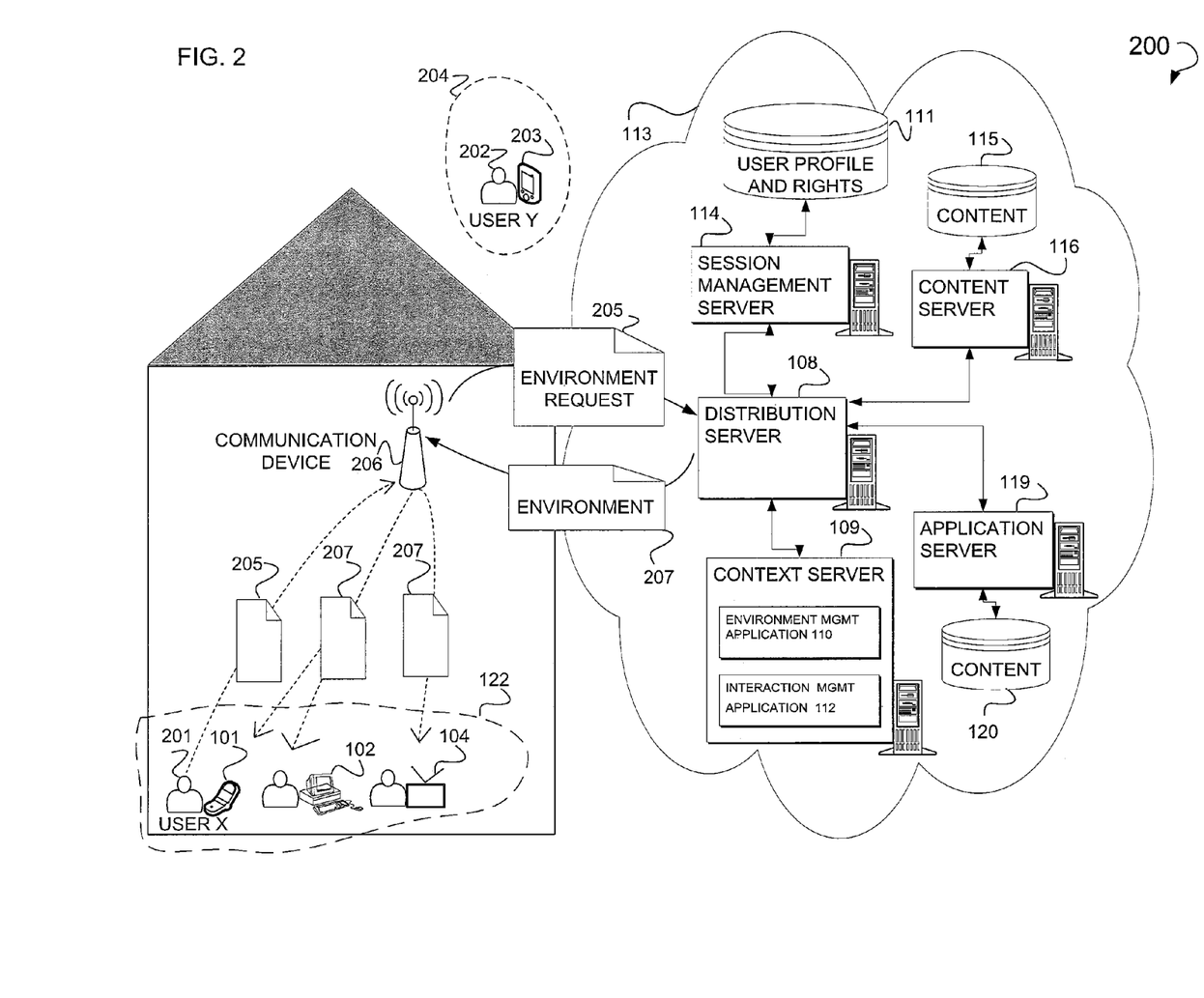
FIG. 2 is a diagram illustrating connection examples of the devices in a network, in accordance with some example embodiments.

FIG. 2 is an example diagram illustrating establishment of sessions in a network, in accordance with some example embodiments. In this example, a user 201, referenced as "user x," is associated with the cell phone 101. The user 201 may also be associated with other devices. Further, shown is the computer 102 and television 104. As previously illustrated in FIG. 1, the cell phone 101, the computer 102, and the television 104 all participate in the context 122. The context 122 may be in the form of a physical structure (e.g., a meeting room, a living room, a coffee shop, etc.). For some example embodiments, each of the devices 101, 102 and 104 may be equipped with a communication interface (e.g., a wireless interface) to enable the device to establish a wireless connection with a wireless router device such as, for example, the communication device 206.

For some example embodiments, the user 201 generates an environment request 205 that is received by the communication device 206 and transmitted across the network 113. The environment request 205 may request for environment information relating to the relative physical location of the devices in a particular context. The environment information may have been previously generated and stored by the environment management module 110 of the context server 109.

The distribution server 108 may receive the environment information 207 from the context server 109 and transmit the environment information 207 to the communication device 206 and to at least the device (e.g., the cell phone 101, computer 102, or television 104) that initiated the environment request 205. Additionally, illustrated is a user 202, referenced as a "user y." The user 202 may be associated with context 204 in which the PDA 203 participates. For some example embodiments, the context 204 and context 122 may be combined together to form a single context. This combination of the two contexts 122 and 204 may occur where the PDA 203 joins the context 122. Joining may occur, for example, based on the PDA 203 being relocated to a location within the context 122.

Device Architecture

Figure 3A:
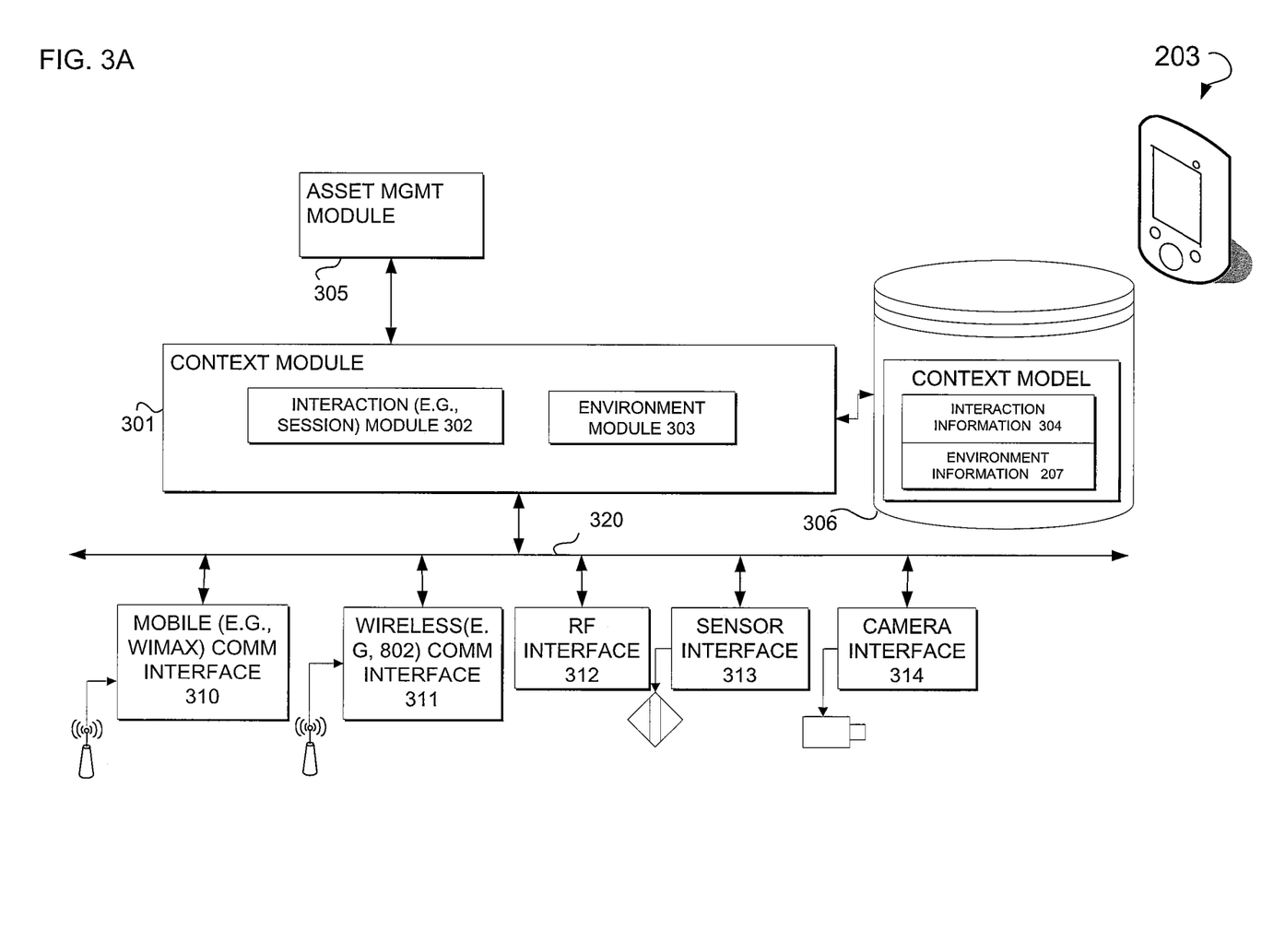
FIG. 3A is a diagram illustrating example architecture of a device, in accordance with some example embodiment

FIG. 3A is an example diagram illustrating architecture of a device, in accordance with some example embodiments. Illustrated is an example PDA 203 that includes functionality that enables the PDA 203 to interact with other devices. The interactions may occur in an environment or a session. The various blocks illustrated in FIG. 3A may be implemented using hardware, firmware, or software. Context module 301 includes an interaction module 302 and an environment module 303. This interaction module 302 may be used to establish a session in which the device 203 may participate. Additionally, the context module 301 may include an environment module 303 that is used to generate the environment request 205, and to process the environment information 207.

Connected to the context module 301 is an asset management module 305. The asset management module 305 may be used to process assets including content and applications. Processing includes, for example, display, play, record, and execute. Example applications include FLASH™ of Adobe Systems Incorporated, ACROBAT™ of Adobe Systems Incorporated, PHOTOSHOP™ of Adobe Systems Incorporated, or some other suitable application. The context module 301 may be connected to a database 306 which may store environment information 207. The database 306 may also store interaction information 304. Included as part of the interaction information 304 may be session information including a session ID along with user ID and/or device ID. The environment information 207 and the interaction information 304 may be parts of a context model 308. The PDA 203 may include various types of communication interfaces 310-314 to facilitate establishing a session, to communicate with other devices, to receive and to generate content, etc.

A combination of at least the context module 301 and the asset management module 305 in a device such as the PDA 203 (as described in FIG. 3A) may be referred to collectively as agent software. The agent software enables a device to communicate with the distribution server 108 and the other servers connected to the distribution server 108 in the network 113. The server and database resources connected to the network 113 (as described in FIGS. 1-2) may be referred to collectively as network services. For some example embodiments, a user may be associated With one or more devices, with each device having a unique device ID. Each user may be associated with a unique user ID.

Figure 3B:
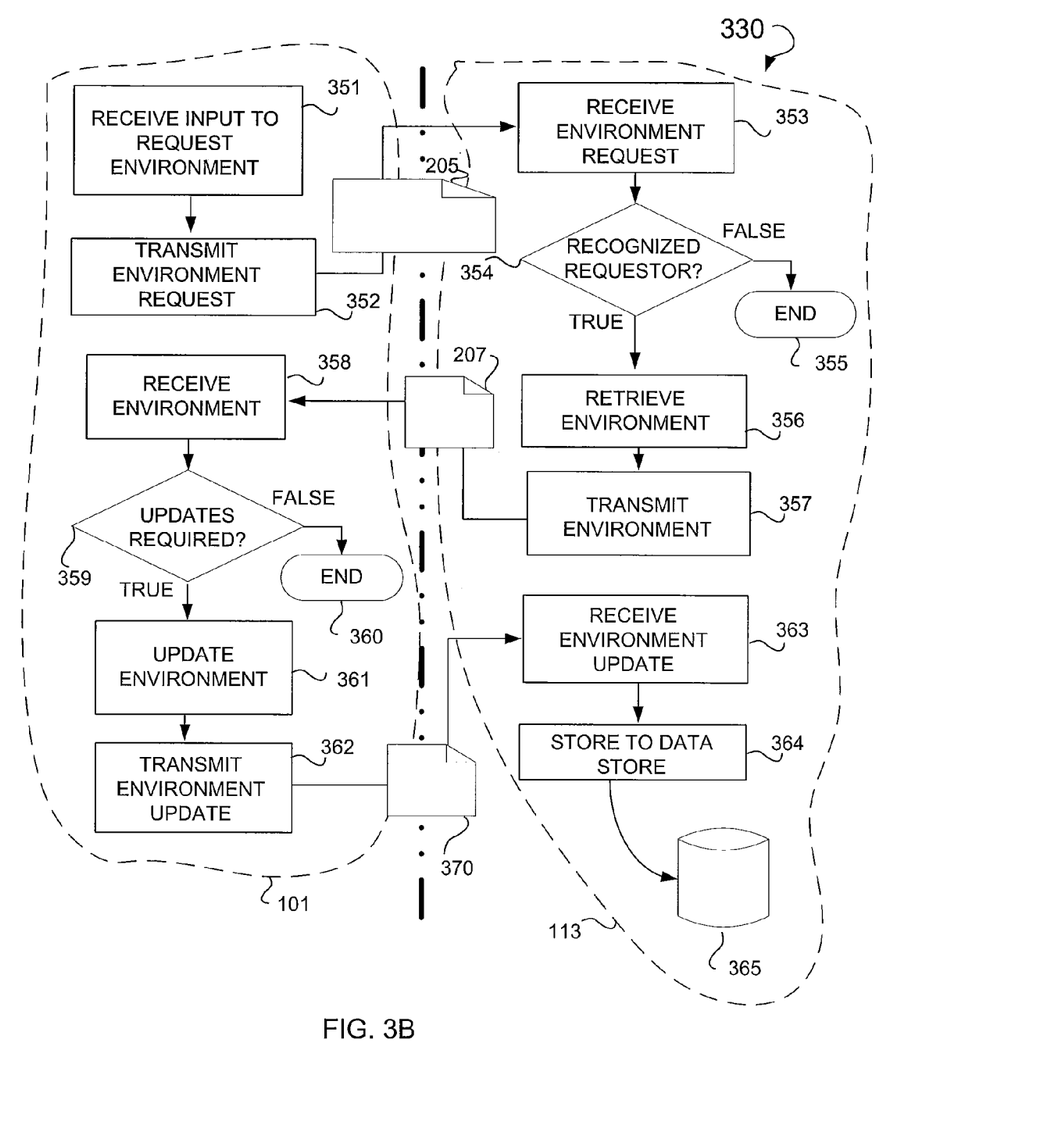
FIG. 3B is a flow diagram illustrating an example method of accessing environment information using a device, in accordance with some example embodiments.

FIG. 3B is a flow diagram illustrating an example method of accessing environment information using a device, in accordance with some example embodiments. The flow diagram may be used to request and receive an environment and to generate an environment update. Shown are operations 351 through 352, and 358 through 362. These various operations may be executed by the cell phone 101, or other suitable device that interacts in a context. Also shown are operations 353 through 357, and 363 through 364. These various operations are executed with the network 113 and the various servers (e.g., 108, 114, 109, and 116) illustrated therein. For example, the distribution server 108 may execute these various operations 353 through 357, and 363 through 364. Shown is an operation 351 that, when executed, receives input to request an environment. This input may be generated by an input device such as a touch screen, mouse, keyboard, light pen, or other suitable input device. Operation 352 is executed to transmit the environment request 205. Operation 353, when executed, receives the environment request. Decisional operation 354 is executed to determine whether the device, and user associated therewith, is recognized as being able to request an environment. Where decisional operation 354 evaluates to "false," a termination condition 355 is executed as the requesting device or user is unrecognized. In case where decisional operation 354 evaluates to "true," an operation 356 is executed. Operation 356, when executed, retrieves an environment from, for example, the context server 109 and data store associated therewith (not pictured). Operation 357 is executed to transmit the environment 207. Operation 358 is executed to receive the environment 207. In some example embodiments, the operation 358 is executed by one of more of the interfaces shown in FIG. 3A. A decisional operation 359 is executed to determine whether an update of the environment 207 is required. In cases where decisional operation 359 evaluates to "false," a termination condition 360 is executed. In cases where decisional operation 359 evaluates to "true," an operation 361 is executed. Operation 361 is executed to update the environment 207. This update may include additional location information relating to the cell phone 101, or other device participating in the context 122. Operation 362 is executed to transmit an environment update 370. This environment update 370 is received through the execution of operation 363. Operation 364 is executed to store the environment update 370 into a data store 365.

Device Responsive to Operations of Another Device

For some example embodiments, a first device may be configured so that it is responsive to operations of a second device and based on an action of a user in response to the operations of the second device. For example, a user may be watching a program on a television (TV) in a living room of a house, and a doorbell rings. The TV program may be suspended because the user is expected to take action relating to answering the door bell. The TV and the doorbell are examples of devices which may be participating in a session. The ringing of the doorbell may be received on the TV via a network that the TV and the door bell are connected to. Similarly, the answering of the door bell may be from the TV. For example, as the user is watching the program on the TV, some form of user interface (e.g., a pop up window) may be displayed on the TV screen to indicate that someone is requesting permission to enter the house. At the same time, an audio simulating the sound of the door bell may be heard from a TV speaker. The user may then provide permission to enter or reject the request to enter by selecting an appropriate response selector on the user interface. After the user selects the appropriate response, the TV program may be resumed from when it was suspended.

Figure 4:
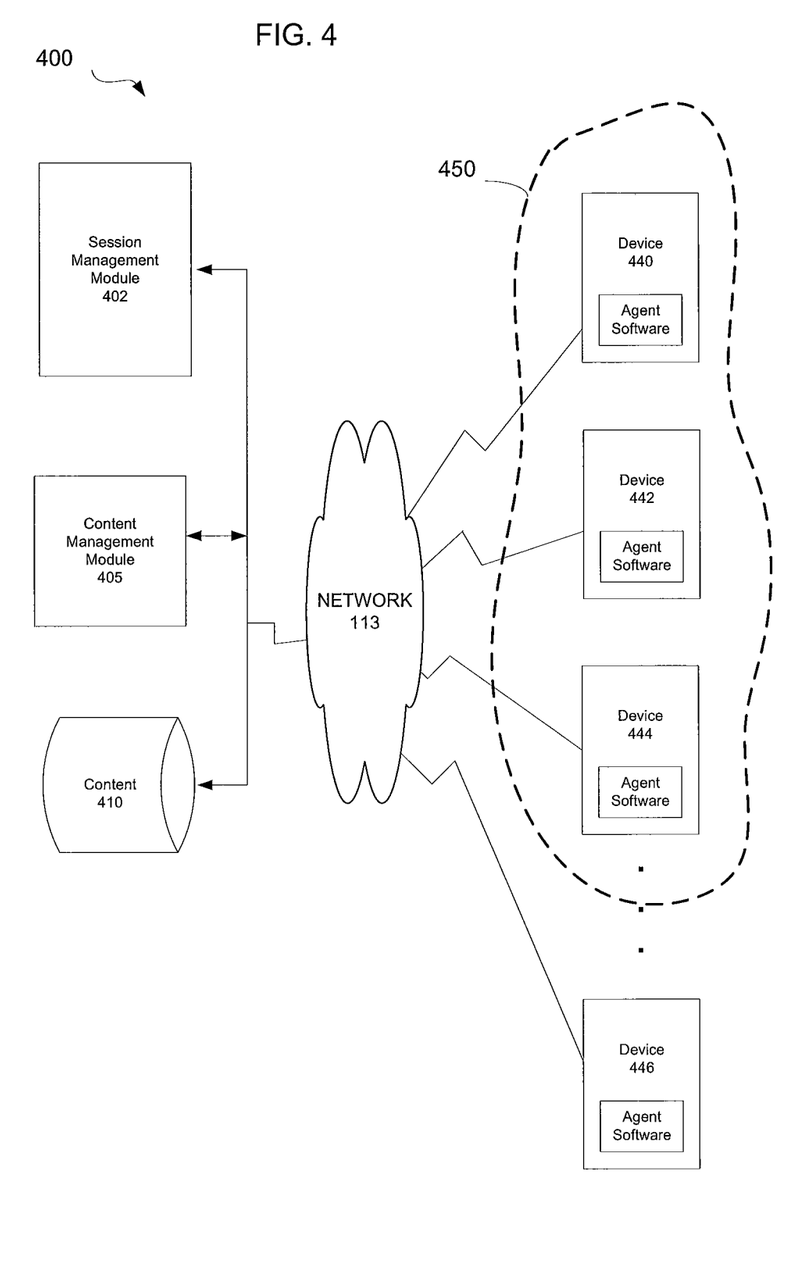
FIG. 4 is an example network diagram illustrating a network that supports suspending and resuming access of content, in accordance with some example embodiments.

FIG. 4 is an example network diagram illustrating a network that supports suspending and resuming of operations on devices, in accordance with some example embodiments. Diagram 400 is illustrated to include various devices and network application logic or modules communicating using the network 113. As described above, the devices 440-446 may participate in various sessions based on their users signing into the network and joining sessions. Merely as an example, the devices 440-444 are positioned within a location 450 (e.g., inside a house). The device 446 is not positioned within the location 450, but it may still be participating in the same session as the devices 440-444. The session may be managed by session management module 402 which may be included in the session management server 114 (illustrated in FIGS. 1-2).

During the time that the devices 440-446 are in the same session, the devices 440-446 may exchange information or content with one another. New content may be generated. Existing content may be copied, combined and transmitted to one or more of the devices 440-446. The content may be stored locally in the devices 440-446. The content may include media content (e.g., video, images, etc.). For some example embodiments, the content or copies of the content may be transmitted to and/or from the network services. For example, the content may be stored in the content database 410 and managed by the content management module 405. Content may be associated with unique content ID.

For some example embodiments, a device may be configured to detect changes in the environment and may alter its operation in response to the changes. The changes in the environment may include a change related to actions of one or more users and/or a change related to an operation of another device. As an example, a change related to an action of a user may include the user leaving an area where a device is operating. Based on detecting the user not being present in the area, the device may suspend execution of one or more applications. As another example, a change related to an operation of another device may include the other device performing an operation that may require the user attention. This may be detected by receiving a signal from the other device indicating that the attention of the user may be required. Execution of an application may be suspended temporarily and may be resumed by a subsequent change in the environment. Another signal may be received to indicate the subsequent change.

This other signal may be generated by the same device that generates the signal that causes the suspension to occur, or it may be generated by another device. The execution of the application is described here merely as an example, and other types of operations (e.g., accessing content, presenting content, etc.) of a device that may be suspended or temporarily stopped in response to changes in an environment may also be applicable. As described above, devices in the same environment may be associated with the same session and may send signals (e.g., suspending signals, resuming signals, etc.) to one another using the same session.

Figure 5A:
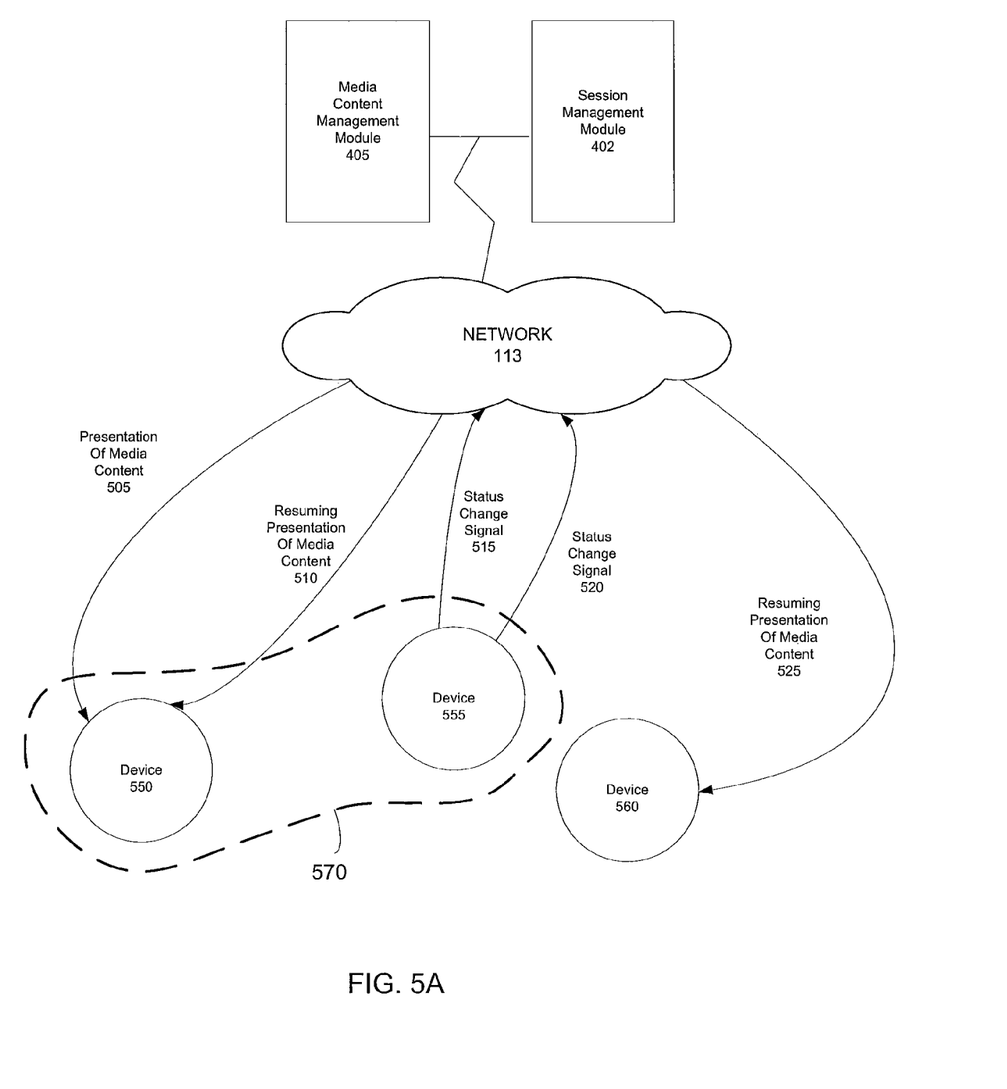
FIG. 5A is a diagram illustrating an example of suspending and resuming actions performed by a device, in accordance with some example embodiments.

FIG. 5A is a diagram illustrating an example of suspending and resuming actions performed by a device, in accordance with some example embodiments. In this example, devices 550, 555 participate in the same session during a first time period. Device 560 joins the session during a second time period. Each of the devices 550, 555 and 560 may include a software agent that enables communicating with the session management module 402. Although not shown, each of the devices 550, 555 and 560 may include logic that enables determining its location information relative to the other devices. For example, the location information may be determined using a global positioning system (GPS) device. In this example, the device 550 and 555 may be positioned within a location 570 (illustrated by the hyphenated loop).

During a first time period, the device 550 may be accessing content. Accessing the content may include one or more of receiving the content and presenting the content. The content ID associated with this content may be kept track of by the content management module 405 in the network services. The content may be transmitted to the device 550 from the network services and then stored locally. This is illustrated by the signal 505. The access of the content on the device may be suspended when a signal is generated by the device 555 indicating a change in status of the device 555. This is illustrated by the signal 515. For example, the user may be watching a TV program and the telephone rings. The ringing of the telephone may be associated with a signal being sent to the TV causing the TV to recognize a status change of the phone (as another device). This status change may cause the user to direct his or her attention to the telephone. As a result, the TV may automatically suspend the program and waits for the user to return.

The signal 515 may be transmitted from the device 555 to the network services and relayed to the device 550. Alternatively, the signal 515 may be transmitted directly to the device 550 using, for example, infrared (IR) signaling. When the signal 515 is transmitted, one or more of the content management module 405 and the session management module 420 may be notified. The access of the content on the device 550 may then be suspended. It may be noted that not all signals generated by the device 555 may cause the access of the content on the device 550 to be suspended. The session management module 420 may analyze signals received from the device 555 to determine if suspension of the content is necessary.

The access of the content on the device 550 may be resumed when another signal is generated by the device 555 indicating another change in the status of the device 555. This is illustrated by the signal 520. Based on receiving the signal 520, one or more of the content management module 405 and the session management module 402 may be notified and the access of the content on the device 550 may be resumed. This is illustrated by the signal 510.

During the time that the access of the content is suspended, the device 550 may indicate to the session management module 402 that the user who was accessing the content is no longer located in the same area as the device 550. For example, the device 550 may include logic that detects user presence. For example, this logic may be included in the sensor interface 313 (illustrated in FIG. 3). This logic may include logic to perform object recognition. Upon receiving the notification that the user is not present, the access of the content may remain suspended. When the user is not present, it is not necessary. It may be noted that the notification that the user is not present may be initiated by the user to indicate that the user is moving to a different location and that the suspension of the program should continues.

During a second time period, the user may sign on to network services using the device 560. As described earlier, the device 560 may be located remotely from the location 570. For some example embodiments, based on receiving the notification that the user is signed on using the device 560, the access of the content that was suspended on the device 550 may now be resumed on the device 560. This is illustrated by the signal 525. For some example embodiments, the network services may include application modules that determine the characteristics and features of the device 560 so that an appropriate version of the content may be transmitted to the device 560. This capability may enable a user to stop accessing the content, perform a task that may require the user to be relocated to a different location, and then continue to access the content using a different device without having to return to the original location. It may be noted that this example assumes that there is one user or one group of users that access the content on the device 550 together. The user or the group of users then relocate to another location and together continue to access the content on the device 560.

Figure 5B:
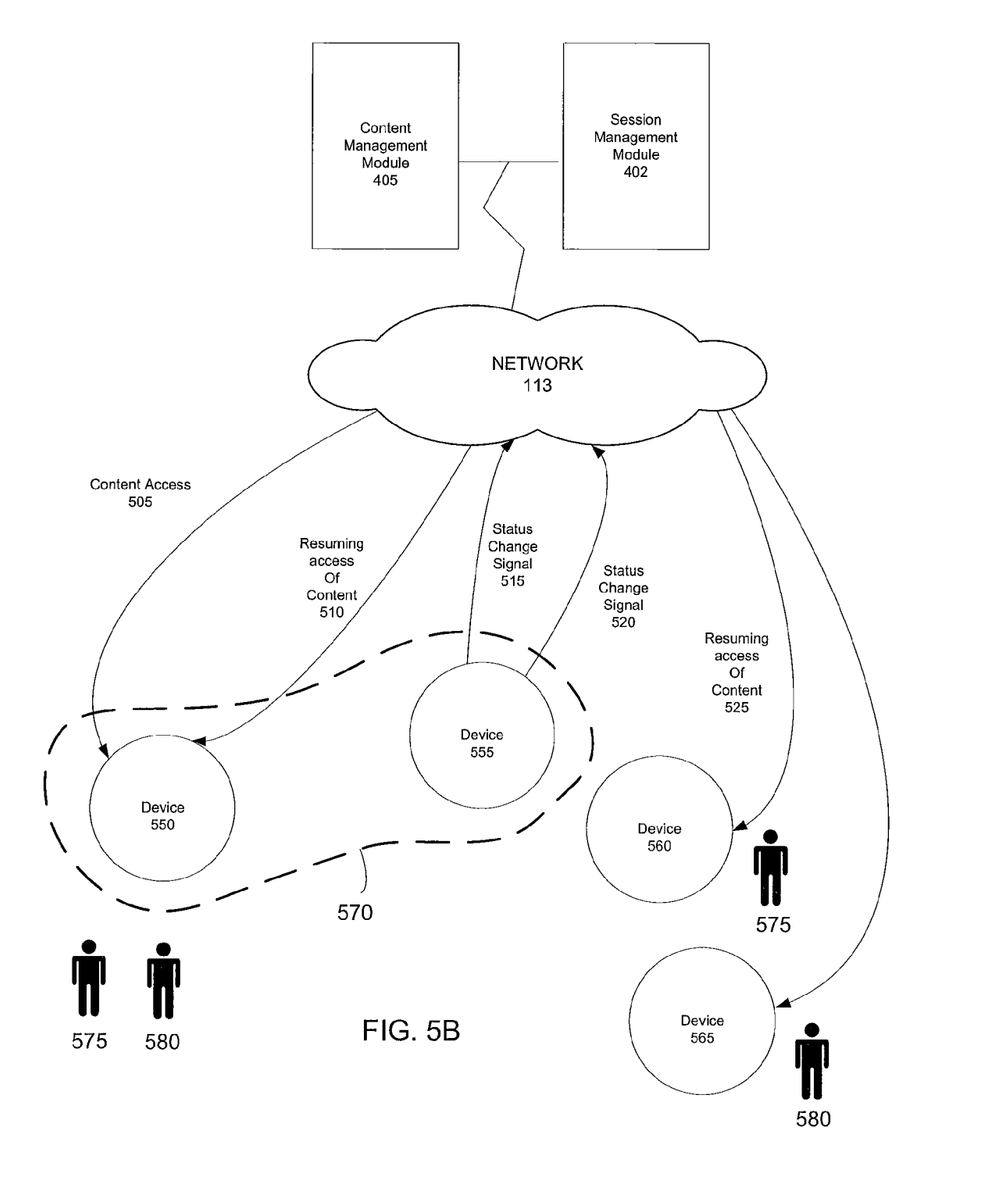
FIG. 5B is a diagram illustrating an example of suspending and resuming actions performed by a device when there are multiple users, in accordance with some example embodiments.

FIG. 5B is a diagram illustrating an example of suspending and resuming actions performed by a device when there are multiple users, in accordance with some example embodiments. This example is similar to the example illustrated in FIG. 5A except that the users use different devices when the access of the content is resumed. Illustrated are two users 575 and 580 associated with the device 550 during the first time period. During the second time period, the user 575 is associated with the device 560 while the user 580 is associated with the device 565. For some example embodiments, if the two users 575 and 580 stop accessing the content on the device 550 at substantially the same reference point, both users 575 and 580 are able to resume the access on the devices 560 and 565 from the same reference point or location in the content.

It may be noted that the resumption of the access on the device 560 and 565 do not necessarily have to be at the same time or at the same physical location. For example, after the program is suspended on the device 550, the user 575 may head to the beach and resume the access with the device 560, while the user 580 may decide to wait and resume accessing the content on the device 565 the next day. For some example embodiments, the session management module 402 and the content management module 405 may keep track of the identity of the users 575 and 580 and the reference points where they stop accessing the content on the device 550. When the users 575 and 580 sign in from the devices 560 and 565, the access of the content may be resumed.

Figure 6:
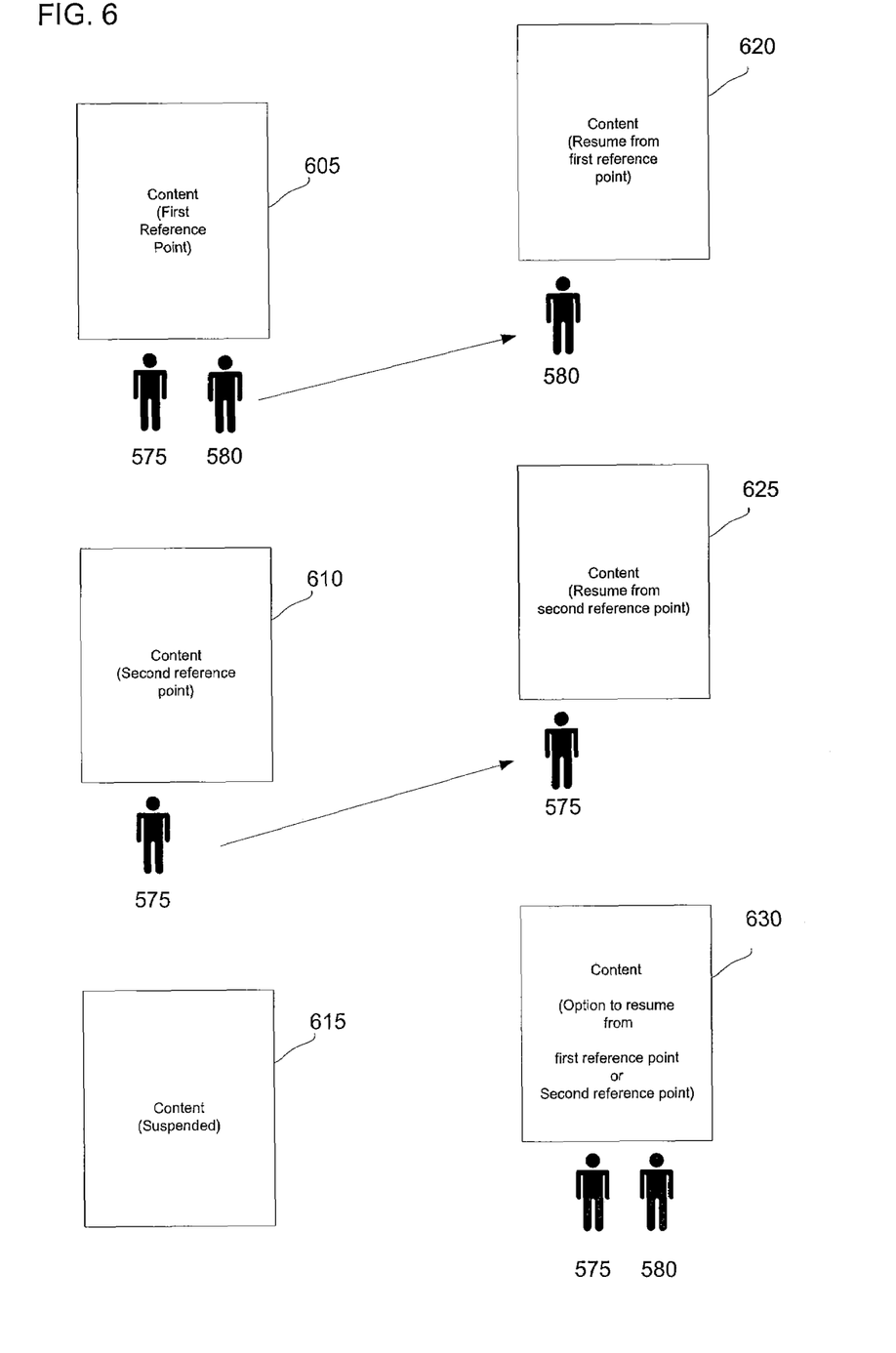
FIG. 6 is a diagram illustrating an example of suspending and resuming actions performed using different devices, in accordance with some example embodiments.

FIG. 6 is a diagram illustrating an example of suspending and resuming actions performed using different devices, in accordance with some example embodiments. In this example, blocks 605, 610 and 615 are associated with the same device. Blocks 620, 625 and 630 may be associated with different devices. Initially, at block 505, both users 575 and 580 are accessing the same content. When the content is at a first reference point, the user 580 may relocate to a different location. The user 580 may use the device associated with block 805 to notify the network services of the relocation. Alternatively, the relocation of the user 580 may be detected automatically by the device associated with the block 605 (e.g., using user detection). After the relocation of the user 580, the user 575 continues to access the content, as illustrated in block 810. When the access of the content is at a second reference point, the user 575 may relocate to a different location. The user 575 may use the device associated with the block 610 to notify the network services of the relocation. As illustrated in block 615, the access of the content is suspended because both of the users 575 and 580 are not present.

Block 620 illustrates the user 580 continues to access the content from the first reference point. Block 625 illustrates the user 575 continues to access the content from the second reference point. It may be noted that a device associated with the block 620 and a device associated with the block 625 may be different from a device associated with the block 605. For some example embodiments, association of a user with a device may be based on user detection.

As described above, an appropriate version of the content may be transmitted from the network services to the device associated with the block 620 and the device associated with the block 625. These may be different devices having different features and capabilities. The network services may keep track of information related to the first reference point and the second reference point. The network services may also keep track of the fact that the user 580 is associated with the first reference point. Similarly, the network services may keep track of the fact that the user 575 is associated with the second reference point.

Block 630 illustrates another option when the users 575 and 580 continue to access the content together on a common device. Since the user 575 is associated with the second reference point and the user 580 is associated with the first reference point, the network services provides options that the users 575 and 580 can select how the access of the content may resume. For example, the users 575 and 580 may agree to resume at the first reference point instead of at the second reference point. It may be noted that the device associated with the block 630 may be the same device that the users 575 and 580 originally used to access the content before the access was suspended.

Flow Diagram

Figure 7:
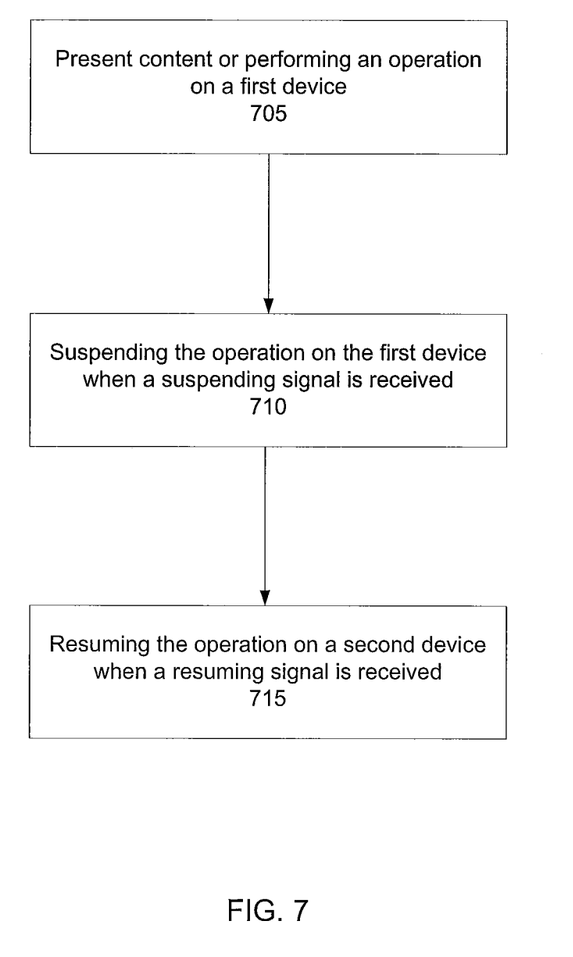
FIG. 7 is an example flow diagram illustrating a method that may be used to present content, in accordance with some example embodiments.

FIG. 7 is an example flow diagram illustrating a method that may be used to access the content, in accordance with some example embodiments. The method may start at block 705 where an operation is executing in a first device. The operation may be a presentation of content. The content may be transmitted to the first device from the network services. For example, the first device may be a large screen TV having architecture similar to the architecture described in FIG. 3. The content may have been stored in the content management module 405, as described in FIGS. 5A-5B.

At block 710, suspending signal may be received. The suspending signal may have been generated by a second device and may need the attention of one or more users accessing the content on the first device. The suspending signal may indicate a change in operational status of the second device. The change in the operational status may include a change in the execution of an application or operation on the second device. For example, an application associated with a telephone may be implemented to have two states, "ringing" and "idle". The telephone is generally idle corresponding to the application being in the "idle" state. When there is an incoming call, the application transitions from the "idle" state to the "ringing" state, thus changing its operational status. In this example, a change in the operational status may be associated with a suspending signal or a resumption signal. Responsive to receiving the suspending signal, the operation (e.g., presentation of content) in the first device may be suspended.

At block 715, a resuming signal may be received. The resuming signal may indicate another change in the operational status of the second device. Responsive to receiving the suspending signal, the operation may be resumed on a third device instead of the first device.

Figure 8:
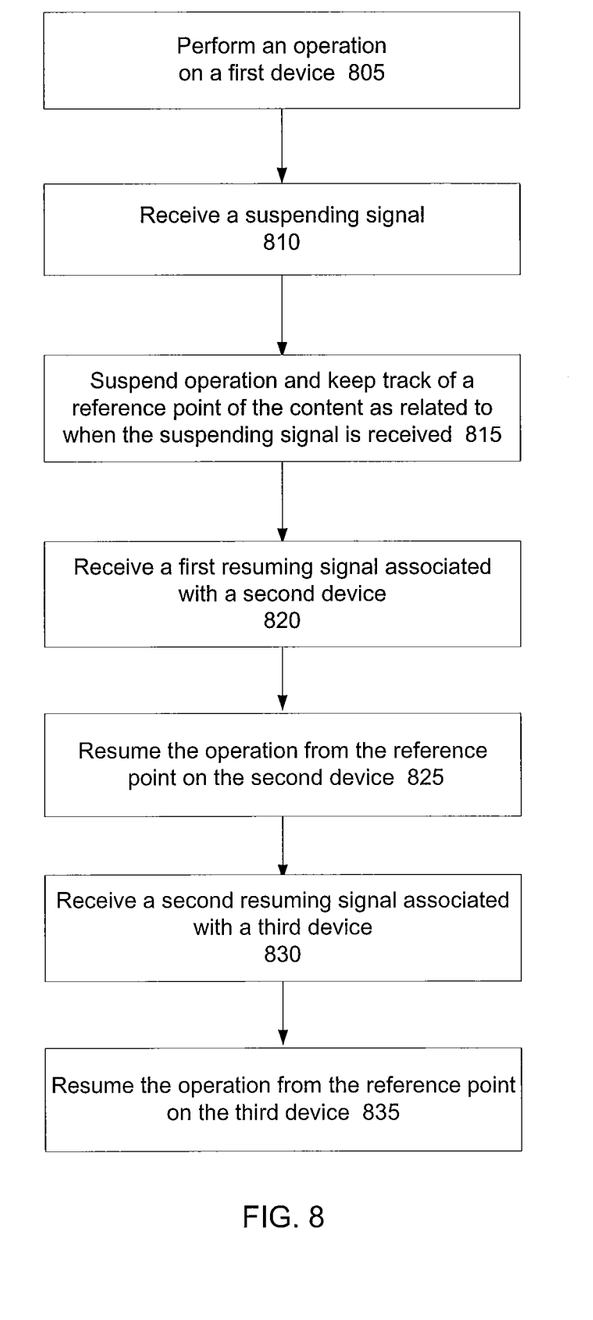
FIG. 8 is an example flow diagram illustrating a method that may be used to present content, in accordance with some example embodiments.

FIG. 8 is an example flow diagram illustrating a method that may be used to access content, in accordance with some example embodiments. In this example, content is accessed by a first person and a second person using a first device. The method may start at block 805 where an operation is executing in a first device. This operation may be presenting content. The content may be transmitted to the first device from the network services. At block 810, a suspending signal may be received. The suspending signal may cause the operation to be suspended. A reference point in the content may be kept track of, as illustrated in block 815.

At block 820, a resuming signal is received. The resuming signal is associated with the first user from a second device. The second device may be located at a different location from the first device. The identity of the first user may be determined based on the first user signing on to the network services using the second device. At block 825, the operation is resumed on the second device from the reference point.

At block 830, a resuming signal is received. The resuming signal is associated with the second user from a third device. The third device may be located at a different location from the first device. The identity of the second user may be determined based on the second user signing on to the network services using the third device. At block 835, the operation is resumed on the third device from the reference point.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic, Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 9:
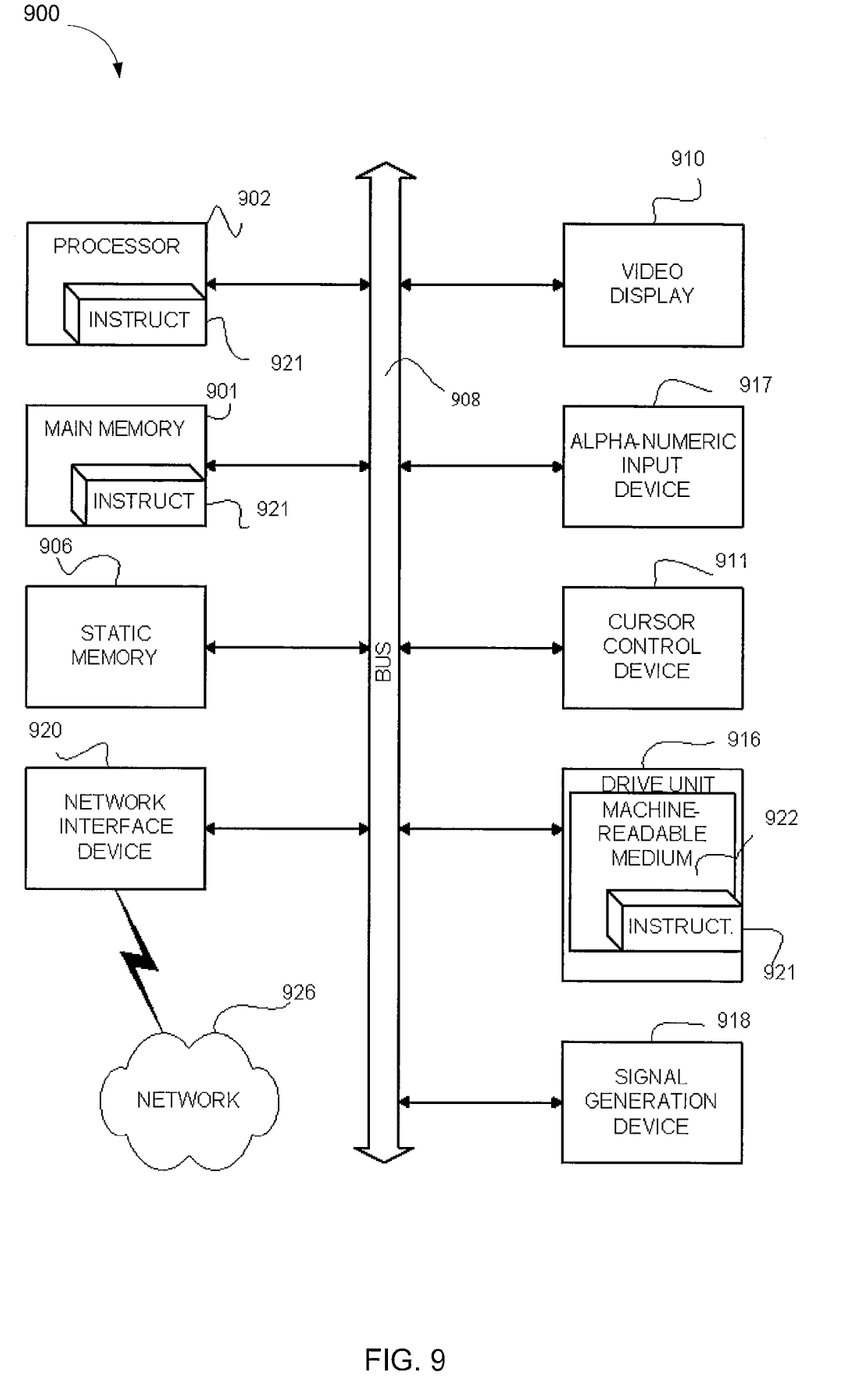
FIG. 9 is a block diagram of machine in the example form of a computer system within which instructions, for causing the machine to perform any one or more of the methodologies discussed herein, may be executed, in accordance with some example embodiments.

FIG. 9 is a block diagram of machine in the example form of a computer system within which instructions, for causing the machine to perform any one or more of the methodologies discussed herein, may be executed, in accordance with some example embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 901 and a static memory 906, which communicate with each other via a bus 908. The computer system 900 may further include a video display unit 910 (e.g., liquid crystal display (LCD) or a cathode ray tube (CRT)). The computer system 900 also includes an alphanumeric input device 917 (e.g., a keyboard), a user interface (UT) navigation device 911 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software 921) embodying or utilized by any one or more of the methodologies or functions described herein. The software 921 may also reside, completely or at least partially, within the main memory 901 and/or within the processor 902 during execution thereof by the computer system 900, the main memory 901 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 921 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments illustrated. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A processor-implemented method comprising:
    at a session management component of a session management server, receiving a first signal from a first device that initiates generation and transmission of the first signal in response to the first device determining a change in functionality detected within the first device;
    causing an operation on a second device to be suspended at a first reference point in response to receiving the first signal that was initially generated and transmitted from the first device in response to the first device determining the change in functionality detected within the first device, the first device being used by a user signed on to a network service; and
    responsive to receiving a second signal from the first device, send a resuming signal to a third device to cause the operation to resume on the third device, wherein the operation is resumed on the third device at the first reference point or at a second reference point at which the operation in the second device was suspended, and wherein the session management component keeps track of the first reference point and the second reference point.

2. The processor-implemented method of claim 1, wherein the operation on the second device is suspended at the first reference point, and wherein the operation is resumed on the third device based on the first reference point.

3. The processor-implemented method of claim 1, wherein the first device generates and transmits the first signal in response to the first device detecting the change in the functionality within the first device from an idle state to a ringing state.

4. The processor-implemented method of claim 1, wherein the first signal is received based on the first device detecting the change in the functionality within the first device from a first state to a second state and wherein the second signal is received based on the first device detecting the change in functionality within the first device from the second state to at least one of the first state or a third state.

5. The processor-implemented method of claim 1, wherein the first device detecting the change in the functionality within the first device occurs prior to user attention to the first device.

6. The processor-implemented method of claim 1, further comprising receiving an indication to cause the operation to be resumed on the third device instead of on the second device.

7. A system comprising:
    a processor and memory having a processor-implemented session management component to manage sessions in a network, the sessions including a first device, a second device, and a third device, the session management component to:
        responsive to receiving a first signal from the first device that initiates generation and transmission of the first signal in response to the first device detecting a change in status detected within the first device, send a suspending signal to the second device to cause at least one operation in the second device to be suspended at a first reference point;
        responsive to receiving a second signal from the first device, send a resuming signal to the third device to cause the at least one operation to resume on the third device, wherein the at least one operation is resumed on the third device at the first reference point or at a second reference point at which the at least one operation in the second device was suspended, and wherein the session management component keeps track of the first and second reference point.

8. The system of claim 7, wherein the session management component communicates the first or second reference point to the third device.

9. The system of claim 7, wherein the first signal is received from the first device responsive to a first change in an operation on the first device that corresponds to the change in status within the first device from an idle state to a ringing state.

10. The system of claim 7, wherein the second signal is received from the first device responsive to a second change in the operation on the first device.

11. The system of claim 7, wherein the session management component receives an indication from the third device that the at least one operation is to be resumed on the third device.

12. A method comprising:
executing instructions on a network-based computing platform so that, responsive to receiving a first signal from a first device that initiates generation and transmission of the first signal in response to the first device determining a change in status detected within the first device, a suspending signal is sent to the second device to cause the second device to suspend presentation of content at a first reference point; and executing instructions on the network-based computing platform so that, responsive to receiving a second signal from the first device, a resuming signal is sent to a third device to cause the third device to resume the presentation of content on the third device at the first reference point or at a second reference point at which presentation of the content on the second device was suspended, the first device, the second device, and the third device communicating with one another in a communication session, wherein a session management component keeps track of the first reference point and the second reference point.

13. The method of claim 12, further comprising electronically receiving data from the third device indicating that the operation is to be resumed on the third device instead of on the second device.

14. The method of claim 13, further comprising electronically storing data about the first reference point associated with suspending the operation on the second device.

15. The method of claim 14, further comprising electronically transmitting the data about the first reference point or the second reference point to the third device based on resuming the operation on the third device.

16. The method of claim 15, wherein data associated with the first signal and the second signal are electronically received from the first device based on wireless communication.

17. The method of claim 12, wherein the network-based computing platform comprises a session management server configured to manage the communication session among the first device, the second device, and the third device.

18. The processor-implemented method of claim 1, wherein the change in functionality detected within the first device comprises a change in location relative to the second device determined using a global positioning system of the first device.

19. The processor-implemented method of claim 1, wherein the change in functionality detected within the first device requires attention by a user and wherein the first signal indicates that the attention of the user is required at the first device.

20. The processor-implemented method of claim 1, wherein the third device is the second device.

* * * * *